May 17, 1966 A. N. STANTON 3,252,013
THERMAL OSCILLATOR UTILIZING RATE OF THERMAL FLOW
Filed Jan. 18, 1963
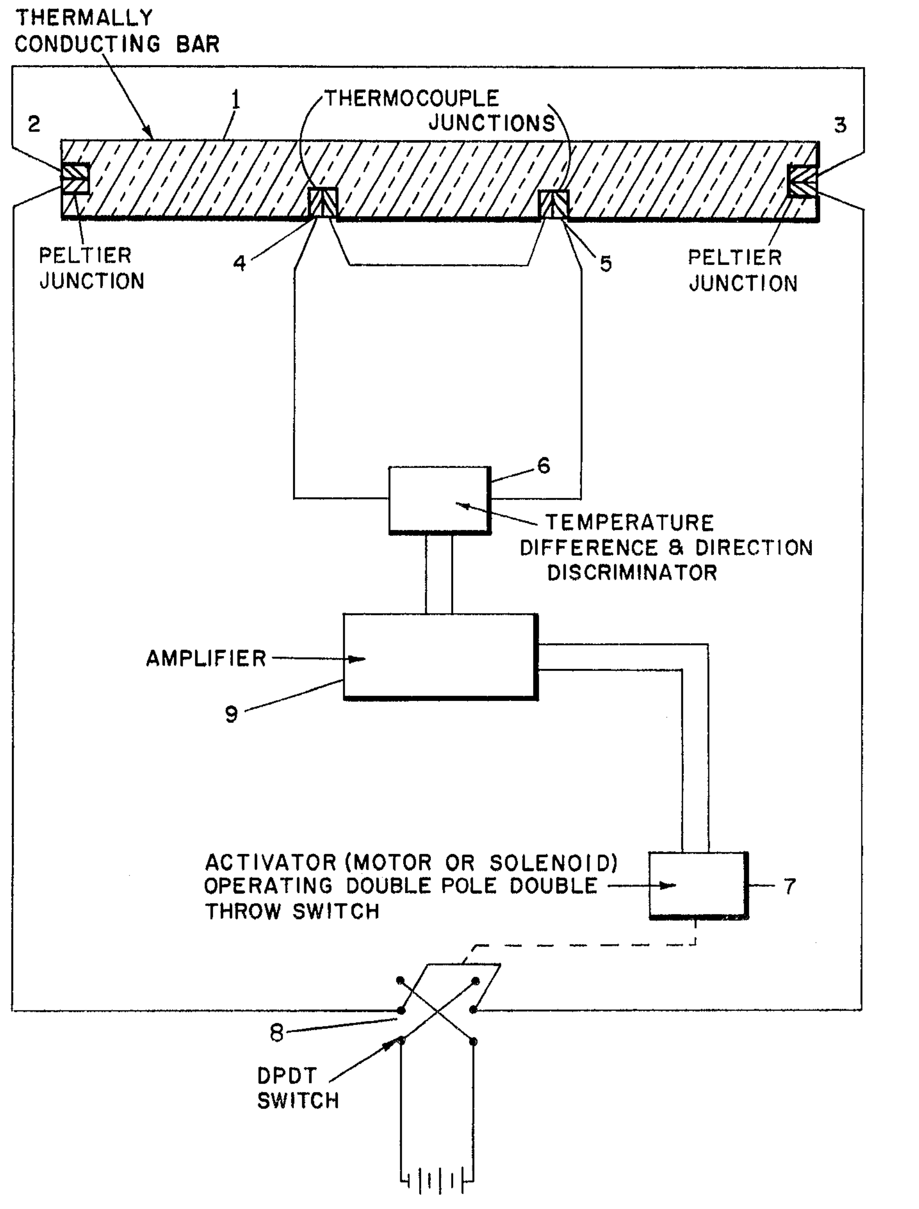
INVENTOR.
AUSTIN N. STANTON
BY Arthur M. Sloan United States Patent Office 3,252,013

Patented May 17, 1966

3,252,013

THERMAL OSCILLATOR UTILIZING RATE OF THERMAL FLOW

Austin N. Stanton, Dallas, Tex., assignor to Varo, Inc., Garland, Tex.

Filed Jan. 18, 1963, Ser. No. 252,514
14 Claims. (Cl. 307—132)

This invention relates to a thermal oscillator which makes use of the rate of thermal flow.

It is an object of this invention to provide a simple, reliable, time keeping device providing relatively long primary intervals.

A further object of this invention is to provide a time delay device utilizing thermal conductivity.

Another object of this invention is to provide a time delay device utilizing repetitive traveling heat or cold waves in a thermal conductor as a time delay service.

Still another object of this invention is the use of thermal conductivity and repetitive traveling heat or cold waves with feed back and amplification to comprise an oscillator.

Other objects and advantages of the invention will be found in the description, the drawing and the claims; and for full understanding of the invention, reference is to be had to the following detailed description and accompanying drawing, wherein The figure represents a schematic drawing of the thermal oscillator of this invention.

Heat flows in a material in the direction of the thermal gradient at rates dependent on the material and to some extent on the temperature, its rate being roughly dependent on the temperature differential between two points.

Heat, or in a special sense, cold, applied as a step function at a reference time $t_0$, travel diminished and with less and less sharp wavefront through a conductor such as a metal bar, arrives after a finite time $t$ at a point $x$, subsubstantially removed from the point of application $x_0$. This time delay is the basis of the oscillator.

If a temperature sensor at $x$ were able to cut off the heater when the temperature at $x$ rose from $T_0$ to $T_1$ and if the heat in the conductor were removed so that the temperature of the conductor returned throughout to $T_0$, and then the temperature sensor turned on the source of heat again, the process would become repetitive and an oscillation would result whose period would be the sum of the time $t$ to $t_0$ between turn on of the heater and cut off of the heater plus the time required to return the temperature to $T_0$.

A Peltier effect device provides a convenient means of cooling one end of a metallic, a ceramic, or other thermally-conducting bar while heating the other end. Reversal of current in the Peltier device would reverse the heating-cooling inputs at the ends of the thermally-conducting bar. The net heat input to the bar, neglecting ohmic heating, would be zero. If the two periods were equal, the average temperature of all parts of the bar would be $T_0$. Ohmic heating would be constant but small, and could be dissipated by ordinary radiation means.

Referring to the sketch, the thermally-conducting bar 1 with Peltier and thermocouple junctions spacially disposed to produce the desired effect is shown. The Peltier junctions are designated 2 and 3. The thermocouple junctions are designated 4 and 5.

The temperatures difference and direction discriminator 6 shown measures the direction and value of voltage from the thermocouple, and when said voltage, due to temperature difference of $2U_K$ applies a current of proper direction and voltage, the activator motor or solenoid 7 reverses the double pole double throw switch 8. Amplifier 9 may be utilized for increasing the magnitude of the signal from the temperature difference and direction discriminator 6.

Many feasible means for accomplishing temperature difference and direction discrimination are known, and any one of these means could be used.

Further any suitable means of reversal of the double pole double throw switch may be used. The functions of the motor and switch may be combined in well known ways.

Means of reversing the current which obviate the necessity of an activator motor include semiconductors or vacuum tubes.

The thermal oscillator of this invention offers a simple reliable time keeping device providing relatively long primary intervals. Time interval accuracy will be, to some extent, limited by ambient temperatures, but this effect can be reduced by the selection of materials for the thermally conducting bar.

Thermal propagation rate and length of the conductor are chosen so that the reflected heating wave front arrives just as the switch over occurs so that the waves will be reflected back and forth in synchronism with the induced inputs. The frequency may be stabilized to an additional degree by holding the temperature of the device constant, with either Peltier devices or heaters or coolers which hold the average temperature above or below ambient.

The significant features of the device are (1) the use of thermal conductivity as a time delay device (2) repetitive traveling heat or cold waves in a thermal conductor as a time delay device (3) the use of thermal conductivity and repetitive traveling heat or cold waves in a thermal conductor with feedback and amplification to comprise an oscillator (4) the above with a Peltier instead of an ohmic heater (5) the combination of repetitive traveling heat and cold waves simultaneously generated by a Peltier device, a means of sensing temperature difference and direction, and a means of reversing the current in the Peltier device (6) the above with a heater and thermostat to stabilize the temperature of the device, and therefore its frequency.

The embodiments of the invention herein shown and described are obviously susceptible of modification without departing from the spirit of the invention, and the invention is intended therefore to be limited only by the scope of the appended claims.

What I claim as my invention is:

1. A thermal oscillator including a thermally conducting bar, Peltier junctions at the ends of the bar, thermocouple junctions disposed along the bar longitudinally equidistance from the ends of the bar, a source of electric power, switching means connected between the source of electric power and the Peltier junctions for reversing the current flow to the Peltier junctions, and means responsive to the voltage from the thermocouple for actuating the switching means.

2. A thermal oscillator including a thermally conducting bar, Peltier junctions at the ends of the bar, thermocouple junctions disposed along the bar longitudinally equidistant from the ends of the bar, a source of electric power, switching means connected between the source of electric power and the Peltier junctions for reversing the current flow to the Peltier junctions, and means responsive to the voltage from the thermocouple for actuating the switching means, such actuating means comprising a temperature difference and direction discriminator.

3. A thermal oscillator including a thermally conducting bar, Peltier junctions at the ends of the bar, thermocouple junctions disposed along the bar longitudinally equidistant from the ends of the bar a source of electric power, a double pole double throw switch connected between the source of electric power and the Peltier junctions for reversing the current flow to the Peltier junctions, and means responsive to the voltage from the thermocouple for actuating the double pole double throw switch, such means comprising a temperature difference and direction discriminator and an activating motor.

4. A thermal oscillator including a thermally conducting bar, Peltier junctions at the ends of the bar, thermocouple junctions disposed along the bar longitudinally equidistance from the ends of the bar, a source of electric power, a double pole double throw switch connected between the source of electric power and the Peltier junctions for reversing the current flow to the Peltier junctions, and means responsive to the voltage from the thermocouple for actuating the double pole double throw switch, such means comprising a temperature difference and direction discriminator, a means of amplifying the signal from the temperature difference and direction discriminator, and an activating motor.

5. A thermal oscillator including a thermally conducting bar, means of heating and cooling the bar disposed at the ends of the bar, thermocouple junctions disposed along the bar longitudinally equidistant from the ends of the bar, a source of electric power, switching means connected between the source of electric power and the means of heating and cooling the bar for reversing the current flow to the means of heating and cooling the bar, and means responsive to the voltage from the thermocouple for actuating the switching means, such actuating means comprising a temperature difference and direction discriminator and an activating motor.

6. A thermal oscillator including a thermally conducting bar, a source of electric power, means of heating and cooling the bar, such means being responsive to the direction of current flow, thermocouple junctions disposed along the bar longitudinally equidistant from the ends of the bar, a double pole double throw switch controlling the direction of current flow to the means of heating and cooling the bar, said double pole double throw switch being connected between the source of electric power and the means of heating and cooling the bar, and means responsive to the voltage from the thermocouple for actuating the double pole double throw switch, such means comprising a temperature difference and direction discriminator and an activating motor.

7. A thermal oscillator including a thermally conducting metallic bar, a source of electric power, means disposed at the ends of the bar for heating and cooling the bar, such means being responsive to the direction of current flow, thermocouple junctions disposed along the bar longitudinally equidistant from the ends of the bar, a double pole double throw switch controlling the direction of current flow to the means of heating and cooling the bar, said double pole double throw switch being connected between the source of electric power and the means of heating and cooling the bar, means responsive to the voltage from the thermocouple for actuating the double pole double throw switch, such means comprising a temperature difference and direction discriminator, a means of amplifying the signal from the temperature difference and direction discriminator, and an activating motor.

8. A thermal oscillator as described in claim 6 wherein the thermally conducting bar is a ceramic material.

9. A thermal oscillator including a thermally conducting bar, a source of electric power, means of cooling one end of the bar while heating the other end, such means being responsive to the direction of current flow, thermocouple junctions along the bar longitudinally equidistant from the ends of the bar, a double pole double throw switch controlling the direction of current flow to the means of heating and cooling the ends of the bar, said double pole double throw switch being connected between the source of electric power and the means of heating and cooling the ends of the bar, means responsive to the voltage from the thermocouple for actuating the double pole double throw switch, such means comprising a temperature difference and direction discriminator, a means of amplifying the signal from the temperature difference and direction discriminator, and an activating solenoid.

10. A thermal oscillator including a thermally conducting bar, a source of electric power, a Peltier device for generating repetitive traveling heat and cold waves simultaneously in the bar, a means of sensing temperature difference and direction, and a means connected between the source of electric power and the Peltier device for reversing the current in the Peltier device, said means for reversing the current being responsive to the means of sensing temperature difference and direction.

11. A thermal oscillator including a thermally conducting bar, a source of electric power, a Peltier device for generating repetitive traveling heat and cold waves simultaneously in the bar, a means of sensing temperature difference and direction, a means connected between the source of electric power and the Peltier device for reversing the current in the Peltier device, said means for reversing the current being responsive to the means of sensing temperature difference and direction, and a heater and thermostat to stabilize the temperature of the bar and therefore the frequency of the oscillator.

12. A thermal oscillator including a thermally conducting bar, a source of electric power, a device for generating repetitive traveling heat and cold waves simultaneously in the bar, a means of sensing temperature difference and direction, a means connected between the source of electric power and the device for reversing the current in the device, and a heater and thermostat to stabilize the temperature of the bar and therefore the frequency of the oscillator.

13. A thermal oscillator comprising a thermally conducting bar, Peltier junctions at the ends of the bar, thermocouple junctions disposed along the bar longitudinally equidistant from the ends of the bar, a source of electric power, a semiconductive switching device connected between the source of electric power and the Peltier junctions for reversing the current flow to the Peltier junctions, and means responsive to the voltage from the thermocouple for actuating the semiconductive switching device, such means including a temperature difference and direction discriminator.

14. A thermal oscillator comprising a thermally conducting bar, Peltier junctions at the ends of the bar, thermocouple junctions disposed along the bar longitudinally equidistant from the ends of the bar, a source of electrical power, a vacuum tube switching device connected between the source of electric power and the Peltier junctions for reversing the current flow to the Peltier junctions, and means responsive to the voltage from the thermocouple for actuating the vacuum tube switching device, such means including a temperature difference and direction discriminator.

No references cited.

ORIS L. RADER, *Primary Examiner.*

LLOYD McCOLLUM, *Examiner.*

W. SHOOP, *Assistant Examiner.*